(12) United States Patent
Chrisman

(10) Patent No.: US 9,092,387 B2
(45) Date of Patent: Jul. 28, 2015

(54) NON-VOLATILE MEMORY DEVICE CAPABLE OF INITIATING TRANSACTIONS

(75) Inventor: Nathan Chrisman, Rescue, CA (US)

(73) Assignee: Micron Technology, Inc., Boise, ID (US)

( * ) Notice: Subject to any disclaimer, the term of this patent is extended or adjusted under 35 U.S.C. 154(b) by 729 days.

(21) Appl. No.: 12/331,772

(22) Filed: Dec. 10, 2008

(65) Prior Publication Data

US 2010/0146233 A1 Jun. 10, 2010

(51) Int. Cl.
*G06F 12/00* (2006.01)
*G06F 13/00* (2006.01)
*G06F 13/16* (2006.01)

(52) U.S. Cl.
CPC ......... *G06F 13/1668* (2013.01); *Y02B 60/1228* (2013.01)

(58) Field of Classification Search
None
See application file for complete search history.

(56) References Cited

U.S. PATENT DOCUMENTS

| | | | |
|---|---|---|---|
| 4,709,137 A | 11/1987 | Yoshida et al. | |
| 5,798,507 A | 8/1998 | Kawagishi et al. | |
| 5,832,286 A * | 11/1998 | Yoshida | 713/324 |
| 6,040,997 A * | 3/2000 | Estakhri | 365/185.33 |
| 6,119,200 A * | 9/2000 | George | 711/106 |
| 6,545,891 B1 | 4/2003 | Tringali et al. | 365/51 |
| 6,665,803 B2 * | 12/2003 | Lunsford et al. | 713/320 |
| 6,859,856 B2 * | 2/2005 | Piau et al. | 711/103 |
| 8,359,654 B2 * | 1/2013 | Rave et al. | 726/26 |
| 2002/0051394 A1 * | 5/2002 | Tobita et al. | 365/221 |
| 2002/0159291 A1 * | 10/2002 | Umemoto et al. | 365/185.18 |
| 2003/0061525 A1 * | 3/2003 | Lunsford et al. | 713/300 |
| 2003/0079077 A1 * | 4/2003 | Piau et al. | 711/103 |
| 2005/0046897 A1 * | 3/2005 | Leason | 358/444 |
| 2005/0050283 A1 * | 3/2005 | Miller et al. | 711/150 |
| 2005/0108297 A1 * | 5/2005 | Rollin et al. | 707/201 |
| 2006/0116184 A1 * | 6/2006 | Hayashi | 455/575.8 |
| 2006/0271760 A1 * | 11/2006 | Nicolai | 711/207 |
| 2006/0289659 A1 * | 12/2006 | Mizushima | 235/492 |
| 2007/0106842 A1 * | 5/2007 | Conley et al. | 711/113 |
| 2009/0040842 A1 * | 2/2009 | Sprouse et al. | 365/189.16 |
| 2009/0125664 A1 * | 5/2009 | Ueyama | 710/305 |
| 2009/0172400 A1 * | 7/2009 | Rave et al. | 713/169 |
| 2010/0185808 A1 * | 7/2010 | Yu et al. | 711/103 |
| 2010/0205350 A1 * | 8/2010 | Bryant-Rich | 711/103 |

FOREIGN PATENT DOCUMENTS

| | | | | |
|---|---|---|---|---|
| CN | 101142630 A | 3/2008 | | |
| EP | 0662674 | 1/1995 | | |
| JP | 602237575 | 11/1985 | | |
| JP | 03-014054 | 1/1991 | | |
| JP | H03-014054 A | * 1/1991 | | G06F 12/16 |

(Continued)

OTHER PUBLICATIONS

Stanley et al. "On-The-Go Supplement to the USB 2.0 Specification." Rev. 1.0. Dec. 2001.*

(Continued)

*Primary Examiner* — Daniel Bernard
(74) *Attorney, Agent, or Firm* — Dorsey & Whitney LLP

(57) ABSTRACT

A non-volatile memory may operate, not in a master/slave arrangement, but in a peer-to-peer arrangement. In some embodiments, the memory may initiate a transaction with a device outside the memory. Thus, the memory may proactively perform tasks conventionally performed by memory controllers and other external devices.

20 Claims, 1 Drawing Sheet

(56) References Cited

FOREIGN PATENT DOCUMENTS

| | | | | |
|---|---|---|---|---|
| JP | 07-334407 | 12/1995 | | |
| JP | 08069512 | 3/1996 | | |
| JP | 08227444 | 9/1996 | | |
| JP | 10-187898 | 7/1998 | | |
| JP | 2002-366919 A | * 12/2002 | ............. | G06K 19/07 |
| JP | 2002366919 | 12/2002 | | |
| JP | 2006-195719 A | * 7/2006 | ............. | G06F 21/24 |
| JP | 2006-195719 | 7/2007 | | |
| JP | 2008-276790 A | * 11/2008 | ............... | G07G 1/12 |
| JP | 2008276790 | 11/2008 | | |
| KR | 10-2003-0084037 A | 11/2003 | | |
| KR | 10-2006-0055541 | 5/2006 | | |
| WO | 2006085323 A2 | 6/2006 | | |
| WO | 2006085324 A2 | 8/2006 | | |
| WO | WO-2006/085324 A2 | 8/2006 | | |
| WO | WO2007/085893 | 8/2007 | | |

OTHER PUBLICATIONS

Korean Patent Office, Korean Office Action issued in corresponding KR Application No. 10-2009-121718, dated Mar. 14, 2011, 5 pgs.

Chinese Patent Office, Chinese Office Action issued in corresponding CN Application No. 200910246794-9, dated Jun. 23, 2011, 13 pgs.

Decision of Rejection issued Mar. 30, 2012 for CN Application No. 200910246794.9.

Korean Office Action received for Korean Patent Application No. 10-2009-121718, dated Sep. 25, 2011, 2 pages.

Final Rejection action received, dated Jul. 13, 2012 for Japanese Appln No. 2009-280323.

Letter of Inquiry for Japanese Appl No. 2009-280323 dated Apr. 26, 2013.

Office Action for JP Appl No. 2009-280323, dated Jan. 7, 2014.

Office Action issued May 29, 2014 for Chinese Appln No. 200910246794.9.

* cited by examiner

NON-VOLATILE MEMORY DEVICE CAPABLE OF INITIATING TRANSACTIONS

BACKGROUND

This relates generally to non-volatile memories.

A non-volatile memory is a microelectronic memory that stores data even when power is removed. Examples of non-volatile memories include static random access memories, flash memories, and phase change memories, to mention a few examples.

Generally, a non-volatile memory is coupled to a memory controller which basically controls all operations of the non-volatile memory. The non-volatile memory then is basically a reservoir of data which is accessed by the memory controller. Transactions between the memory controller and the non-volatile memory are initiated by the memory controller.

DETAILED DESCRIPTION

In accordance with some embodiments of the present invention, instead of using the conventional master/slave relationship between the memory controller and the non-volatile memory, a peer-to-peer relationship may be utilized. In the peer-to-peer relationship, the non-volatile memory may initiate transactions.

As used herein, a "transaction" is any activity, involving something more than the provision of data or information, outside of the non-volatile memory or any request to an entity outside the non-volatile memory. As used herein, the term "initiate" means to begin a transaction without input from any other external device. As used herein, a non-volatile memory is a microelectronic storage device that retains information when power is off and that includes an array of rows and columns of addressable memory cells.

Figure 1:
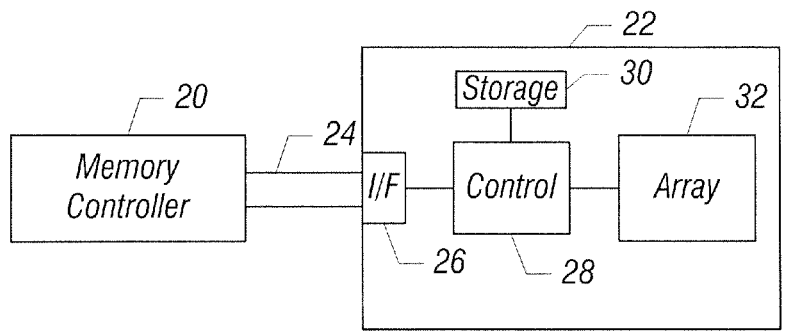
FIG. 1 is a schematic depiction of one embodiment of the present invention.

Referring to FIG. 1, a non-volatile memory 22 may be a single integrated circuit. The non-volatile memory 22 may, for example, be a flash memory, a static random access memory, or a phase change memory, to mention a few examples. The memory 22 may include an array 32 composed of rows and columns of memory cells which are addressable by column and row addressing circuitry. A control 28 may be a processor-based device or a smart logic device, to mention two examples.

The control is coupled to an external bus 24 when the memory 22 is in use by an interface 26, in one embodiment. The control 28 may have a storage 30 which is separate from the array 32 in some embodiments. For example, the storage may be a code storage that may be implemented by static random access memory. However, in other embodiments, the control 28 may use memory cells in the array 32. Thus, in some embodiments, the interface, the control, the storage, and the array are all integrated in the same integrated circuit substrate.

The memory 22 may be provided in one single package and, in some embodiments, may be completely compatible with sockets or receivers traditionally used for mounting packaged non-volatile memory integrated circuits. The size of the packaged integrated circuit memory 22 and its pin configuration may be completely compatible with existing sockets and other devices that receive such devices. In some embodiments, the memory 22 may be used in place of conventional non-volatile memories in the same positions and locations and in the same way they are conventionally used, except that the memory 22 can initiate transactions.

The memory 22 may initiate transactions under control of the control 28 in one embodiment. The control 28 may issue requests or other transactions, including communications, through an interface 26 with a bus 24. In some embodiments, outgoing communications may be implemented through a separate pin connection on the external package. In other embodiments, a pin used for other purposes may also be used for such outgoing transactions. In some embodiments, the pin used for outgoing transactions may be bidirectional and may receive responses from the memory controller 20.

The non-volatile memory 22 that can initiate transactions may have a number of applications. One application is in connection with cellular phones where a small footprint and ability to do more functions may make the memory advantageous in many areas. Thus, in some cases, the non-volatile memory 22 may find particular applicability in connection with mobile devices, but its applicability is not so limited.

Generally, the memory 22 may initiate requests for information on its own initiative without waiting for polling or other outside stimulus. Likewise, the memory 22, in some embodiments, may also provide information to or through the memory controller upon its own initiative, without waiting for polling or other outside stimulus.

As an example, when the memory controller 20 accesses the memory 22 over a bus 24, the memory 22 on its own may ask for security information, such as a password or authentication. It may receive the password or authentication back from the memory controller, may compare the password or authentication data to information stored on the memory 22, for example, in the storage 30, and may decide whether or not to allow access to the memory. Thus, such a memory may have particular applications in secure information storage, including the storage of highly confidential data and in the storage of code and other information that hackers would like to compromise.

Similarly, the memory 22 can request the status information from the memory controller. For example, if the memory 22 knows that the memory controller is powered down, or that the memory controller has information that it will not use for a period of time, this information can be used by the memory 22 to decide to perform internal background or maintenance activities, such as wear leveling. In addition, the memory 22 may obtain information about the memory controller status in order to set the power consumption state of the memory 22.

Also, the memory 22 may request bus access from the memory controller 20 in order to initiate transactions with the rest of a processor-based system. This allows the memory to actively be involved in activities within the system. In some cases, tasks normally performed by the main or central processing unit of the processor-based system may be offloaded to the control 28. This may free the main or central processor to do other activities. It may also enable transferring activities from the memory controller 20 in some embodiments.

As still another example, the memory 22 may initiate transactions in order to self-configure itself. For example, the memory 22 may initiate transactions to cause the system to provide information to the memory 22 to facilitate such configuration. It may also obtain preference information from the system in order to configure the memory 22. The memory 22 may configure itself by setting partition sizes, ignoring requests to certain addresses, operating at different speeds or in different read modes, such as burst, page mode, or other modes, offer alternatives, or ask for synchronous speed information so that the memory either speeds up or slows down to either operate more quickly or to save power when operating speed is less important.

Figure 2:
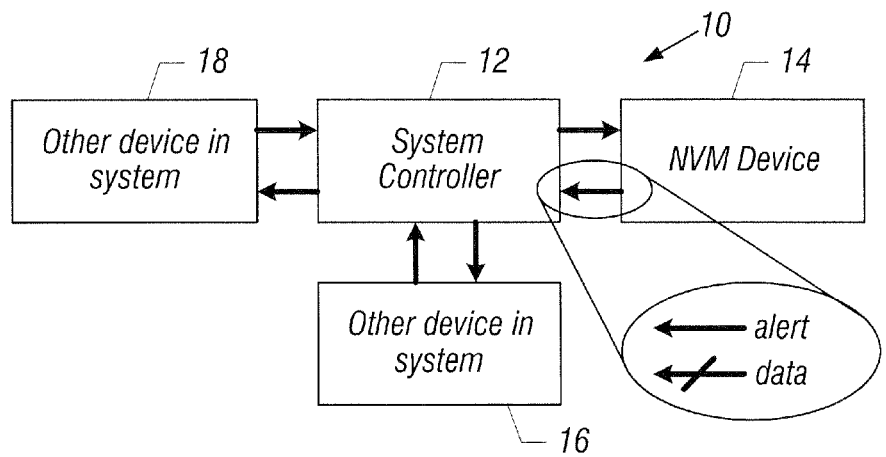
FIG. 2 is a system depiction of one embodiment of the present invention.

Thus, referring to FIG. 2, a processor-based system 10, such as a mobile device, may include the non-volatile memory 14 which is made up of the packaged, single integrated circuit 22. The system 10 may be any mobile device or a non-mobile device. One application for the non-volatile memory device 14 may be in connection with cellular telephones. The non-volatile memory device 14 may interact with a system controller 12. The system controller may be a memory controller, in some embodiments, or may be a controller at any level in a system architecture from a central processing unit down to the memory controller. The system may include other devices 18 and 16 as depicted.

In some embodiments, the memory device 14 may receive inputs, as indicated by the arrow directed toward the non-volatile memory device 14, as is conventional in slave-type non-volatile memory devices. However, the non-volatile memory device 14 may also initiate transactions, as indicated by the outgoing arrow. These transactions may include data that is offered by the non-volatile memory without stimulus from the outside of the non-volatile memory device 14. It may also include alerts, as indicated in FIG. 2, to indicate non-volatile memory issues, including memory defects, memory capacity, memory speed, security concerns, power consumption state, and wear leveling, to mention a few examples.

Figure 3:
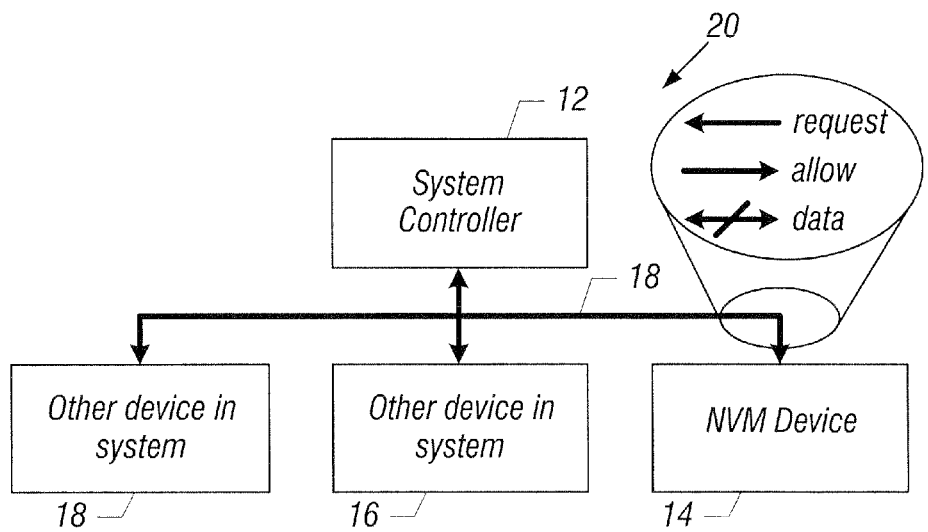
FIG. 3 is a system depiction of one embodiment of the present invention.

In addition to having a direct access to the system controller 12, as indicated by FIG. 2, the non-volatile memory device 14 may have a shared connection to the system controller 12, as indicated in FIG. 3. In this embodiment, the communications may include outgoing requests from the non-volatile memory device 14 and responses, indicated by the term "allow," as well as bidirectional data. Thus, the system 20 may allow the non-volatile memory device to directly initiate transactions in some circumstances.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A non-volatile memory, comprising:
   a memory array;
   a control coupled to the memory array and configured to receive requests from a memory controller outside said non-volatile memory to access the memory array, the control further configured to initiate one or more of a plurality of transactions with the memory controller, wherein the plurality of transactions comprises an alert to the memory controller without being prompted by the memory controller or an external device and a request to memory controller for the memory controller to allow the control to directly initiate a transaction with the external device, wherein the transaction is a request for security information, and wherein the control is further configured to provide a status request to the memory controller to determine if the memory controller has information that will not be used for a period of time, and based on the memory controller having information that will not be used for a period of time, the control performs maintenance activities on the memory array.

2. The memory of claim 1, further including storage to store instructions for execution by said control.

3. The memory of claim 1, wherein the alert comprises a memory speed, a power consumption state, a memory defect, or a combination thereof.

4. The memory of claim 1, wherein the control is further configured to provide a non-volatile memory alert.

5. The memory of claim 1, wherein the control is configured to initiate a transaction including a request for bus access by the memory.

6. The memory of claim 1, wherein the control is configured to initiate a transaction including a request for information from the memory controller.

7. The memory of claim 1, wherein the control is configured to request information to enable the memory to configure itself.

8. The memory of claim 1, wherein the memory is configured to be received in a conventional non-volatile memory mounting arrangement.

9. The memory of claim 1, wherein the control is configured to initiate a transaction requesting information from a device outside said non-volatile memory.

10. A method comprising:
    enabling a non-volatile memory to directly initiate one or more of a plurality of transactions with a memory controller outside said non-volatile memory or a device external to both the non-volatile memory and the memory controller,
    wherein the plurality of transactions comprises providing data to the memory controller without stimulus from outside of the non-volatile memory device and providing a request to the memory controller to allow the control to directly initiate a transaction with the device external to both the non-volatile memory and the memory controller;
    enabling the memory to seek security authorization from a device attempting to access said memory;
    providing a status request to the memory controller to determine a power state of the memory controller; and
    based on the memory controller being powered down, performing wear leveling on the non-volatile memory.

11. The method of claim 10, further including:
    providing a non-volatile memory alert.

12. The method of claim 10, further including:
    initiating a transaction that involves a request for information from a device outside the non-volatile memory.

13. The method of claim 10, further including:
    enabling the memory to initiate a transaction including a request for bus access.

14. The method of claim 10, further including:
    enabling the memory to initiate a transaction including a request for information from the memory controller.

15. The method of claim 10, further including:
    enabling the memory to request information to enable the memory to configure itself.

16. The method of claim 10, further including:
enabling the memory to fit within a conventional, non-volatile memory socket.

17. The method of claim 10, further including:
enabling the memory to initiate a transaction prior to receiving a stimulus from outside the memory related to said transaction.

18. A system, comprising:
a memory controller; and
a non-volatile memory coupled to the memory controller, comprising:
   a memory array;
   a control coupled to the memory array, the control configured to begin an activity with the controller without first being prompted by an external device and to request for the controller to allow the control to directly initiate a transaction with the external device, wherein transaction is a request for security information,
   wherein the control is further configured to provide a status request to the memory controller to determine if the memory controller has information that will not be used for a period of time, and based on the memory controller having information that will not be used for a period of time, the control performs maintenance activities on the memory array; and
   code storage, separate from the memory array, configured to store code for operation of the control.

19. The system of claim 18, wherein the control is configured to provide a request without first receiving an outside stimulus related to said request.

20. The memory of system 18, wherein the control is configured to seek security authorization from a device attempting to access said memory.

* * * * *